US011145055B2

(12) United States Patent
Jin et al.

(10) Patent No.: US 11,145,055 B2
(45) Date of Patent: Oct. 12, 2021

(54) DEEP LEARNING-BASED PET SCATTER ESTIMATION SYSTEMS AND METHODS USING AN INCEPTION NEURAL NETWORK MODEL

(71) Applicant: GE Precision Healthcare LLC, Wauwatosa, WI (US)

(72) Inventors: Xiao Jin, San Ramon, CA (US); Jiahua Fan, New Berlin, WI (US); Scott David Wollenweber, Waukesha, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 126 days.

(21) Appl. No.: 16/527,731

(22) Filed: Jul. 31, 2019

(65) Prior Publication Data

US 2020/0043163 A1  Feb. 6, 2020

Related U.S. Application Data

(60) Provisional application No. 62/712,753, filed on Jul. 31, 2018.

(51) Int. Cl.
*G06T 7/00* (2017.01)
*G06N 3/08* (2006.01)
(Continued)

(52) U.S. Cl.
CPC ............. *G06T 7/0012* (2013.01); *G06N 3/08* (2013.01); *G06T 5/002* (2013.01); *G06T 5/20* (2013.01);
(Continued)

(58) Field of Classification Search
CPC ......... G06T 7/0012; G06T 5/002; G06T 5/20; G06T 2207/30168; G06T 2207/20081;
(Continued)

(56) References Cited

U.S. PATENT DOCUMENTS

2018/0247195 A1* 8/2018 Kumar ................... G06N 3/126
2020/0273214 A1* 8/2020 Xu .......................... G06N 3/08

OTHER PUBLICATIONS

Szegedy, C. et al. Going deeper with convolutions. Preprint at http://arxiv.org/ abs/1409.4842 (2014), article archived at arxiv.org on Sep. 17, 2014, 12 pages.
(Continued)

*Primary Examiner* — Ayodeji O Ayotunde
(74) *Attorney, Agent, or Firm* — Hanley, Flight & Zimmerman, LLC

(57) ABSTRACT

Systems, apparatus, methods, and computer-readable storage media to estimate scatter in an image are disclosed. An example apparatus includes a network generator to generate and train an inception neural network using first and second input to deploy an inception neural network model to process image data when first and second outputs of the inception neural network converge, the first input based on a raw sinogram of a first image and the second input based on an attenuation-corrected sinogram of the first image, the inception neural network including a first filter of a first size and a second filter of a second size in a layer to process the first input and/or the second input to generate an estimate of scatter in the first image. The example apparatus also includes an image processor to apply the estimate of scatter to a second image to generate a processed image.

20 Claims, 5 Drawing Sheets

(51) Int. Cl.
G06T 5/00 (2006.01)
G06T 5/20 (2006.01)
(52) U.S. Cl.
CPC .......... G06T 2207/10104 (2013.01); G06T 2207/20081 (2013.01); G06T 2207/20084 (2013.01); G06T 2207/30168 (2013.01)
(58) Field of Classification Search
CPC ........... G06T 2207/20084; G06T 2207/10104; G06N 3/08
USPC ........................................................ 382/131
See application file for complete search history.

(56) References Cited

OTHER PUBLICATIONS

Kingma et al., Adam: A Method for Stochastic Optimization, Published as a conference paper at ICLR 2015, article archived at arxiv.org on Jan. 30, 2017, 15 pages.

Abadi et al., TensorFlow: Large-Scale Machine Learning on Heterogeneous Distributed Systems, article archived at arxiv.org on Mar. 16, 2016, 19 pages.

François Chollet and others, "Keras," GitHub repository, https://github.com/fchollet/keras, (2015), 5 pages.

Watson, C.C., Newport, D.M.E.C. and Casey, M.E., 1996. A single scatter simulation technique for scatter correction in 3D PET. In Three-dimensional image reconstruction in radiology and nuclear medicine (pp. 255-268). Springer, Dordrecht, 2 pages.

Qian et al., Deep Learning Models for PET Scatter Estimations, IEEE, 2017, 5 pages.

Kemp, B. J., et al. "Performance Measurements of a PET/CT System with Prototype SiPM Detectors." IEEE Nuclear Science Symposium and Medical Imaging Conference (2015), M4CP-82. 1 page.

Lewellen, T.K. and Harrison, R.L., 2012. The simset program. In Monte Carlo Calculations in Nuclear Medicine, Second Edition, CRC Press, 1 page.

* cited by examiner

DEEP LEARNING-BASED PET SCATTER ESTIMATION SYSTEMS AND METHODS USING AN INCEPTION NEURAL NETWORK MODEL

CROSS-REFERENCE TO RELATED APPLICATIONS

This patent arises from U.S. Provisional Patent Application Ser. No. 62/712,753, which was filed on Jul. 31, 2018. U.S. Provisional Patent Application Ser. No. 62/712,753 is hereby incorporated herein by reference in its entirety. Priority to U.S. Provisional Patent Application Ser. No. 62/712,753 is hereby claimed.

FIELD OF THE DISCLOSURE

This disclosure relates generally to image processing and, more particularly, to image processing using scatter estimation using an inception neural network model.

BACKGROUND

The statements in this section merely provide background information related to the disclosure and may not constitute prior art.

Scattered elements or artifacts in obtained image data degrade a quality of the resulting image and can obscure and/or otherwise interfere with readability and/or other diagnostic quality of the image. For example, gamma photon scatter in a positron emission tomography image degrades the efficacy of the image to estimate a physiological parameter in vivo. Such scatter can be caused by an object or other point source emitting radioactivity to cause axial and/or transaxial distortion in the resulting image.

Scatter and/or other artifact can also be found in a computed tomography image. Such scatter degrades image quality (e.g., reduces the diagnostic readability of the image) and/or introduces elements that appear to be objects in the image but are instead artificial indications or artifacts introduced in the image data from an object in the imaging field (e.g., photons, etc.). For example, Poisson noise can result from low photon counts and can introduce random bright and dark streaks in the image in a direction of greatest attenuation.

Misidentification of scatter effects in an image as a malignant and/or other foreign body in a patient can lead to unnecessary testing and treating. Conversely, scatter effects may obscure or mask a legitimately malignant mass and/or other foreign body that should be examined and treated further for the health of the patient. As such, there is a need to reduce effects of scatter in obtained diagnostic images.

BRIEF DESCRIPTION

Systems, methods, and apparatus to generate and utilize an inception neural network model to estimate scatter in an image are disclosed and described.

Certain examples provide an apparatus including a network generator to generate and train an inception neural network using a first input and a second input to deploy an inception neural network model to process image data when a first output of the inception neural network from the first input converges with a second output of the inception neural network from the second input, the first input based on a raw sinogram of a first image and the second input based on an attenuation-corrected sinogram of the first image, the inception neural network including a first filter of a first size and a second filter of a second size in a concatenation layer to process at least one of the first input or the second input to generate an estimate of scatter in the first image. The example apparatus also includes an image processor to apply the estimate of scatter to a second image to generate a processed image and to output the processed image for at least one of storage or display.

Certain examples provide at least one computer-readable storage medium including instructions that, when executed, cause at least one processor to: train an inception neural network using a first input and a second input formed from a first image, the first input based on a raw sinogram of the first image and the second input based on an attenuation-corrected sinogram of the first image, the inception neural network including a first filter of a first size and a second filter of a second size in a concatenation layer to process at least one of the first input or the second input to generate an estimate of scatter in the first image; test the inception neural network to determine convergence between a first output of the inception neural network from the first input and a second output of the inception neural network from the second input; and deploy a model of the inception neural network to process a second image to estimate image scattering in the second image for removal of the estimated image scattering from the second image to generate a processed image.

Certain examples provide a method of processing an image to estimate and remove image scatter. The example method includes training an inception neural network using a first input and a second input formed from a first image, the first input based on a raw sinogram of the first image and the second input based on an attenuation-corrected sinogram of the first image, the inception neural network including a first filter of a first size and a second filter of a second size in a concatenation layer to process at least one of the first input or the second input to generate an estimate of scatter in the first image. The example method includes testing the inception neural network to determine convergence between a first output of the inception neural network from the first input and a second output of the inception neural network from the second input. The example method includes deploying a model of the inception neural network to process a second image to estimate image scattering in the second image for removal of the estimated image scattering from the second image to generate a processed image.

BRIEF DESCRIPTION OF DRAWINGS

The features and technical aspects of the system and method disclosed herein will become apparent in the following Detailed Description set forth below when taken in conjunction with the drawings in which like reference numerals indicate identical or functionally similar elements.

DESCRIPTION

Figure 1:
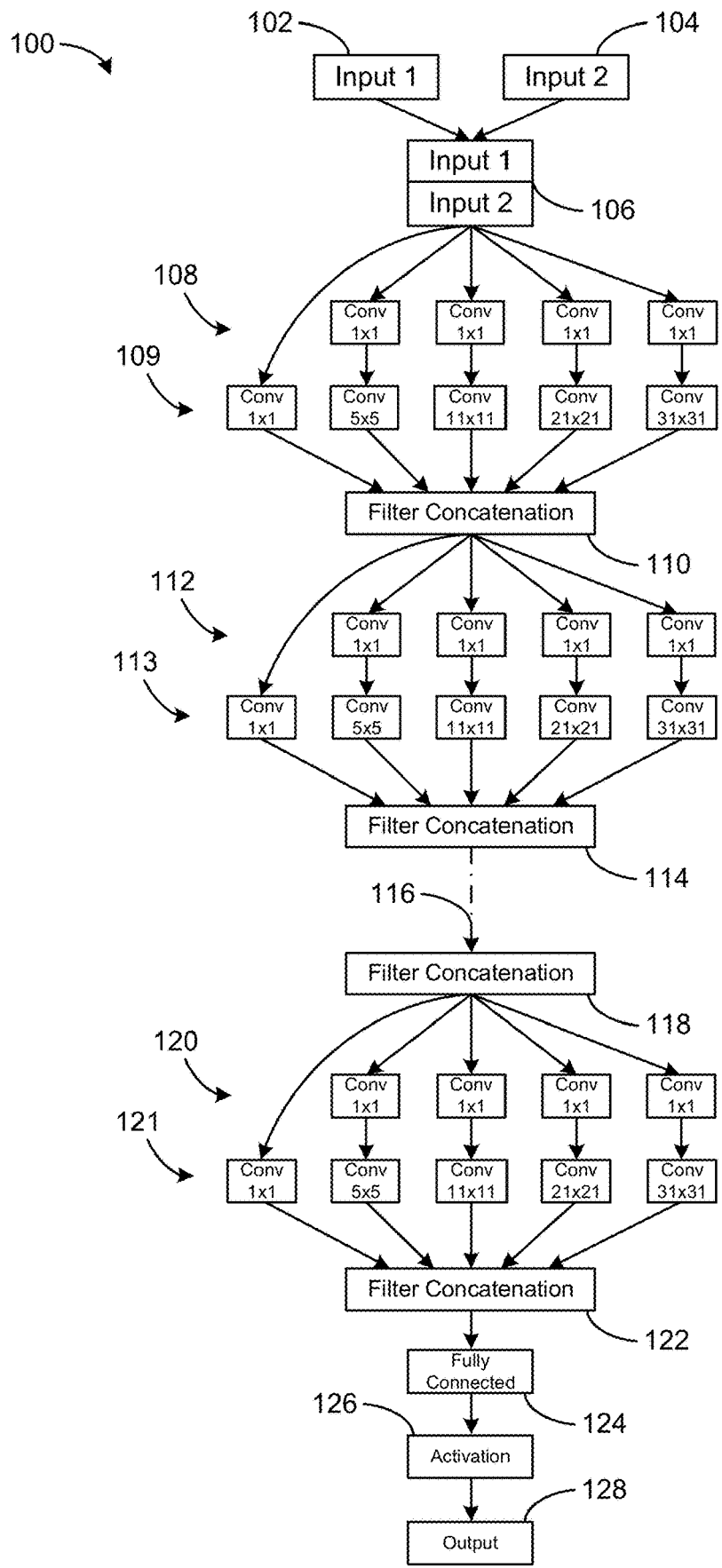
FIG. 1 illustrates a framework of the neural network design to compute the scattered events in positron emission tomography (PET) imaging.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

In addition, it should be understood that references to "one embodiment" or "an embodiment" of the present disclosure are not intended to be interpreted as excluding the existence of additional embodiments that also incorporate the recited features.

Certain examples are disclosed and described below in connection with positron emission tomography imaging and associated scatter. However, the systems and methods described and disclosed below can be applied to estimate and remove scatter from other image types, such as computed tomography (CT) images, single-photon emission computed tomography (SPECT) images, x-ray images, etc.

Conventionally, when performing a positron emission tomography (PET) scan, a method of single scatter simulation (SSS) is adapted to estimate the scattered events. A radioisotope tracer must first be introduced into the patient's body. A PET scan image is constructed when a collection of pairs of emitted gamma photons from the radioisotope are scattered off of the tracer inside a patient's body. Each pair of photons will be emitted from the patient's body in opposite directions. If either of the photons hit part of the patient's body such as a bone or tissue, the photon will change direction and scatter, and the photons can no longer be paired. This scattering of photons often results in noisy (e.g., including blurring and/or other image artifacts) PET scan images. Both the paired and scattered photons are used to create the initial PET scan image. The collections of photons are then reconstructed, requiring an estimation and correction of the scattered photons, to be read as a sinogram. In comparison to a CT scan, a PET scan has much more noise due to scatter and random events. Once the scattering has been estimated in the PET scans, subtracting the SSS estimation from the PET scan will leave behind an image that is "cleaner" (e.g., some or all scatter effect removed) than the initial image.

Before being read, the data is processed using a variety of approaches including estimation. PET scans and the method of SSS can be computationally expensive if the simulation grid of the emission and scatter data points are finely sampled. On the contrary, the accuracy of SSS may be affected if the data points are coarsely sampled or when the count statistic is low. In addition, the SSS model only estimates the distribution of the events that undergo one instance of scattering. Multiple scattering of the gamma photons can occur, and this phenomenon must be separately estimated. When a gamma photon travels through the patient's body, the photon can travel for a long distance before it gets scattered and changes direction. SSS models produce very rough estimates and often take a long time to be simulated. Filters that are too small do not have a receptive field that is large enough to capture the scatter medium that is far away from the emission source. On the other hand, filters that are too large cannot capture the local details of the structures and may also be computationally expensive. A balance must be struck to discover the ideal filter size that could capture the range of data points while still capturing enough details.

PET scatter can be estimated in variety of ways including deep learning. For example, a convolutional neural network (CNN) can be used to estimate PET scatter. A CNN includes a plurality of layers where each layer executes a math computation, convolution, etc., on the image. A CNN can include a filter box, such as a 5×5, 10×10, or 100×100, etc., that is applied to an input image. A bounding box executes the convolutions row by row and column by column in order to get local image information. If a large filter is used and only a small amount of data exists the estimation can be very unreliable and increase the chances of overfitting. Instead, certain examples use a deep learning estimation method to achieve both improved accuracy and computational efficiency. In certain examples, an inception neural network model can be used to estimate PET scatter.

Typically, in order to increase the performance of a deep neural network, the size of the network must increase. Certain examples provide an inception neural network model that can be used to better estimate PET scatter by widening, rather than deepening, the neural network. The wider inception network can be more efficient and accurate than previously used methods. As a deep neural network extends deeper, the likelihood of a bottleneck increases. Expanding the width of the inception network, rather than increasing the depth of the network, can decrease the potential of a computational bottleneck. Despite the increased width of the inception architecture, the neural network is able to operate using fewer parameters than previously used networks.

An inception neural network is a type of CNN in which, rather than stacking convolution layers deeper and deeper in hopes of better performance, filters of multiple sizes operate on the same level of the network. Thus, rather than deeper, with more layers of filters, the inception network becomes wider with multiple filters of different sizes occupying the same layer in the network. Thus, rather than a layer of 1×1 filters, another layer of 3×3 filters, and another layer of 5×5 filters, a single layer of an inception network can include 1×1, 3×3, and 5×5 filters, for example. Pooling can be performed, and outputs of the filters are concatenated and sent to the next network layer, for example. In certain examples, convolutions can be factorized to divide a more computationally expensive convolution into multiple convolutions that are computationally faster (e.g., a 5×5 convolution becomes two 3×3 convolutions, etc.). Convolutions can be factorized from an n×n filter to a combination of 1×n and n×1 convolutions. Thus, a 100×100 filter convolution can be factorized to a combination of 1×100 and 100×1 convolutions. Wider, rather than deeper, banks of filters in the inception network help to remove computational bottlenecks and improve the computational speed of the image analysis. In certain examples, to increase network stability, residual activations of nodes or modules can be scaled via an activation layer to reduce filter node activations.

A PET scan often results in a noisy image. The noise is caused in large part due to the tendency of the gamma photons to scatter and change direction. The high degree of scattering and change in direction makes it difficult for a designer to predict the ideal size of the filters to be used in a neural network. An ideal filter size for a neural network filter is small enough to capture the local details, but large enough to capture the large spread of scattering photons. Certain examples provide an inception neural network model to estimate PET scattering. The inception network is well suited for the task of estimating PET scatter because of its capability to concatenate filters of various sizes into one layer, thus reducing the computational burden and the number of parameters for the neural network model to train. The inception network can be very flexible in designing the size of the convolution filters. Within each layer the filters can range anywhere from 1×1 to one that is large enough to cover the entire field of view (FOV). The inclusion of the 1×1 filters allow for the number of parameters in the network to be reduced by between five times and ten times. Adding an additional 1×1 convolution to each channel greatly decreases the computational cost of the inception network. Despite the addition of a filter, the total number of input channels saves computational resources. For example, adding a 1×1 filter in the same channel with a 5×5 filter reduces the number of inputs from twenty-five to one. Unlike the CNN model that incorporates boxed kernel sizes such as 10×10 and 100×100, the inception model can use kernel sizes such as 100×1 and 1×100. The 100×100 boxed kernel size is analogous to two separate kernel sizes of 100×1 and 1×100. The split of the kernel into two smaller kernels allows for a reduction in the total number of parameters (e.g., a reduction in parameters by a factor of 5 to 10, etc.). The separation allows the designer of the neural network to design much bigger filters that are more physically accurate than smaller filters but are not required to be trained as much as larger filters, for example.

The utilization of the inception model to estimate PET scatter improves upon many of the current practices in the PET imaging industry. The ability to split a boxed kernel of size n×n into a two filters of size 1×n and n×1 vastly reduces the number of parameters to be trained. A boxed kernel has n times n number of parameters while a split of the boxed kernel into two kernels only has n plus n number of parameters. The reduction in the number of parameters reduces the computational cost for training because there are fewer parameters to be trained. Additionally, the robustness of the network is improved by reducing the probability of overfitting. Overfitting occurs when a neural network remembers examples from training but does not know how to generalize what it has learned to unique situations. In other words, overfitting occurs when the neural network approximates the input data with a model that does not fit future data inputs. This can be caused when a large network with large kernel sizes is used against small amounts of data relative to the size of the network. The reduced number of parameters in the network reduces the chance of overfitting. The inception neural network model can adapt filters of various sizes, providing flexibility in design, without requiring many parameters to train.

Before the inception neural network is ready for implementation it must be trained. The inception neural network is trained and utilized with two inputs, the first input is a raw PET emission sinogram and the second input is an attenuation-corrected PET emission sinogram of the first input. Included in the training process can be both single scatter and multiple scatter random, simulated events. The first input can be corrected for random coincidences and detector and geometry normalization factors, for example. The second input data is designed so that both inputs include PET data and allow for a consistency and comparability between the inputs into the inception neural network. Therefore, a ratio between the first and the second input forms attenuation correction factors.

Using a Monte-Carlo simulation, for example, data is used to train and validate the inception neural network. This simulated data can include known phantoms such as a NEMA IQ phantom, a Zubal phantom, a brain-like phantom, etc. A simulated phantom can be used as the second input that is compared to the raw sinogram. The phantom simulation can be put through the neural network and generate a known and expected image. Simultaneously (or substantially simultaneously given data processing, transmission, and/or storage delay, etc.), the raw sinogram can be put through the neural network allowing its output can be compared with the known output of the phantom simulation. Observing any differences can guide modification of parameters (e.g., network weights, etc.) in the neural network. This process can be repeated until the output of the raw sinogram provides reliable and verified results (e.g., compared to a threshold, percentage difference, margin of error, etc.). Once the inception network has been trained, the neural network can be deployed as a neural network model and applied to real patient data to estimate PET scatter confidently.

Turning to the figures, FIG. 1 illustrates an example inception neural network 100 that can be used to train and compute scatter events in PET imaging. As shown in the example of FIG. 1, layers 108, 112, 120 include 1×1 convolution filters. Layers 109, 113, 121 can include a plurality of filters of various different sizes. The inclusion of 1×1 filters allows for a reduction in the number of parameters and reduces the computational cost of training, for example. The example inception network 100 can include varying numbers of layers 108, 109, 112, 113, 120, 121 depending on a desired quality of output, for example. The two inputs shown originate from the same PET image, one input 102 being the raw sinogram while the other input 104 is an attenuation correction of the same PET scan/image. Because the two PET scan inputs 102, 104 share similar physical phenomenon, a consistent comparison is enabled to train and utilize the inception neural network 100 when estimating PET scatter.

As shown in the example of FIG. 1, the first input 102 is a raw PET emission sinogram and the second input 104 is an attenuation corrected PET emission sinogram. Alternatively or in addition, the first input 102 can include a raw (e.g., prompt coincidence) sinogram paired with a second input 104 of an attenuation correction factor sinogram formed from a ratio of raw sinogram to attenuation corrected sinogram, for example.

In certain examples, both inputs 102, 104 are joined together 106 to be one input 106 into the inception neural network model 100. A layer of filters 108 takes the input of the pair of inputs 106. The layer of filters 108 includes filter sizes from 1×1 to 31×31. The range in filter sizes allow for the layer of filters 108, 112, 120 to capture an entire FOV and local details of the PET image. Once each of the convolutions has filtered out or isolated/identified particular features, the different filter channels are concatenated to form an estimation of the PET scatter. This process can be repeated a number of times 116 until the filter concatenation 122 results in a PET scatter estimation that is verifiable. Following the final filter concatenation 122, the neural network 100 is fully connected 124 such that each node in the particular layer has a connection (e.g., a certain weighted connection) to each node in the following layer. Each connection between nodes may possess different weights and probabilities that trigger its activation. Connections are built or strengthened as the network is trained and ultimately lead to a neural network with the optimal architecture to estimate PET scatter.

As shown in the example of FIG. 1, an activation layer 126, based a rectified linear unit (ReLU), is incorporated to decide whether or not a connection between nodes will be used to estimate photon scattering. The ReLU implements a rectifier or activation function. As such, the activation layer 126 can be written as the function $f(x)=x^+=\max(0, x)$ where x is an input to a node in the activation layer 216, only values greater than zero are equal to "x", and all values less than zero are adjusted to zero. The activation layer 126 speeds up both training and execution of the neural network by telling the neural network that a connection is either on or off. By limiting the triggering of the nodes to a binary selection, either on or off, the neural network 100 can decrease its computational burden. The activation layer 126, by determining which nodes to fire, can optimize the neural network 100 for each separate PET image. Finally, an output layer 128 generates a best estimation of the photon scattering to be used in processing the associated PET image. Thus, an amount of scatter and its location (e.g., its axial and transaxial distributions, etc.) in the image can be identified by nodes in the layers of the network and constructed into an estimate of scatter for the image. That scatter estimate can be output for application back to the source image being processed. For example, the determined photon scattering can be subtracted and/or otherwise removed from the associated PET image to provide a cleaner, more reliable image with reduced blurring, artifacts, and/or other effects of photon scattering. During training, the output 128 of the network 100 can be processed using a loss function, such as mean squared error, etc., and the network can be optimized and/or otherwise improved using Adam optimization, other Stochastic optimization, etc.

Using the inception neural network model 100, for example, provides a multi-scale architecture in which an output of multiple of layers is fed to a classifier to identify scatter effects in an image. Thus, rather than connecting intermediate layer output to a next layer input, output of lower layers in the inception neural network is also fed to a classifier. As such, lower level features identified by the lower layers of the network can be provided to the classifier (e.g., the full connected layer 124 and activation layer 126) to determine scatter in the image being processed. Additionally, layers 109, 113, 121 of the inception neural network model 100 can include a plurality of convolution filters of various sizes within the single layer, rather than requiring multiple layers to accommodate the various sizes. This design allows the inception neural network model 100 to be wider rather than deeper, allowing more parallel processing of image data by filters in a given layer and fewer layers awaiting image data for processing from a previous layer. Such an arrangement improves accuracy, improves speed of processing, and reduces training time and number of model parameters to be trained, for example.

For example, simulated data can be used to train the neural network. An example simulation can be performed based on a GE Discovery MI PET/CT scanner that contains SiPM-based detectors with 4.0 mm×5.3 mm×25 mm LYSO crystals, for example. In such an example, the transaxial field-of-view (FOV) is 700 mm, and the axial FOV is 200 mm. Ten digital phantoms are simulated in this example using the SimSET Monte-Carlo simulation tool. True, random, single scatter, multiple scatter events are simulated.

The attenuation and detector normalization factors are also simulated. Table 1 provides a list of the simulated phantoms in this example.

TABLE 1

Simulated phantoms used in training the neural network

| Phantom | Dimension | Main Features |
| --- | --- | --- |
| Annulus | 20 cm × 20 cm × 20 cm | 3 cm thick ring |
| Cylindrical | 20 cm × 20 cm × 20 cm | uniform |
| Cylindrical | 30 cm × 30 cm × 20 cm | uniform |
| Cylindrical | 40 cm × 40 cm × 20 cm | uniform |
| Elliptical | 40 cm × 27 cm × 20 cm | lungs + lesions |
| Hoffman Brain | 16 cm × 12 cm × 11 cm | white & grey matter |
| IEC NEMA | 23 cm × 30 cm × 24 cm | hot & cold spheres |
| Lower abdomen | 40 cm × 27 cm × 20 cm | hot bladder |
| Point Source | 35 cm × 35 cm × 20 cm | point sources in warm background |
| Zubal | 45 cm × 40 cm × 20 cm | upper abdomen |

In this training example, the neural network model includes an input layer, five blocks of layers of concatenated filters (e.g., only two layers are shown in the example of FIG. 1 as the intermediate blocks are identical), a fully connected layer, a final activation layer and an output layer. Within a block, each layer includes the concatenation of five filters whose sizes range from 1×1 to 31×31. The smaller filters are designed to capture the local structures, and the larger filters are designed to account for the scattering medium that is far away from the emission source. The trained neural network can be tested with real phantom data and clinical data acquired on a GE 20 cm Discovery MI PET/CT scanner, for example.

In this training example, the neural network is trained on TensorFlow with a Keras frontend. The number of filters for each filter type is 16 in this example. The mean squared error is used as the loss function, Adam is used as the optimizer, and the activation functions are ReLU. Learning rates are used as the default values, and the data is trained in batches of 16 for 10 epochs, for example.

Figure 2:
FIG. 2 illustrates a comparison between a deep learning predication of a scatter sinogram and a phantom simulated scatter sinogram.

FIG. 2 illustrates an example difference between an inception network 100 prediction of a PET scatter sinogram 210 and a phantom simulated scatter sinogram 220. The simulated scatter sinogram 220 obtained from a phantom of known characteristics (e.g., dimensions, density, effects, etc.) can also be referred to as the ground truth. Both single scatter and multiple scatters are included in the sinograms. Additionally, out of axial field of view scatter can be included in the scatter evaluation and estimation to provide a more accurate estimation of scatter not available in other techniques.

Figure 3:
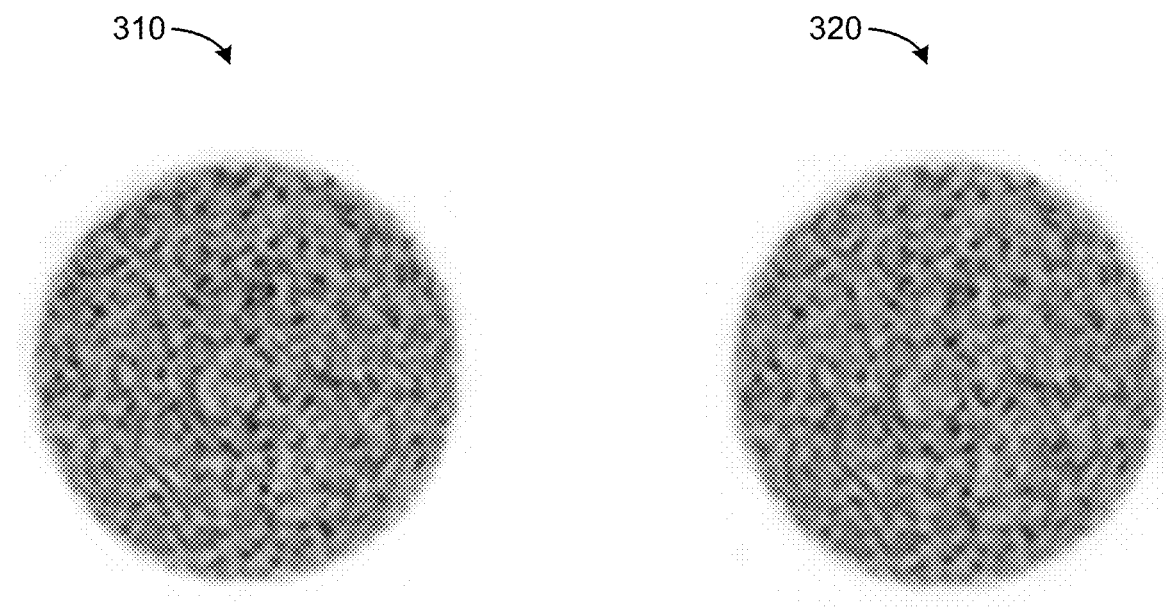
FIG. 3 illustrates a reconstructed image of a cylindrical phantom using both the deep learning predicted sinogram and the simulated scatter sinogram.

FIG. 3 illustrates an example comparison between reconstructed sinogram images. One image is an image 310 of a scatter-corrected cylindrical phantom using deep-learning scatter estimation that is predicted by the inception neural network 100. The second image 320 is an image of the cylindrical phantom with model-based scatter correction. Both single scatter and multiple scatters are applied in the deep learning prediction image and the image reconstruction.

Both FIG. 2 and FIG. 3 demonstrate that a trained inception neural network model used to estimate PET scatter can generate a reliable scatter profile that is consistent with the ground truth phantom estimations. The deep learning predications, especially the implementation of the inception neural network, can make more reliable estimations using less computational resources than previously used methods.

In certain examples, a ground truth phantom simulation is used to train the inception network by acting as a comparison to the raw input image. Continued alterations can improve both the accuracy and computational efficiency of the inception model.

Figure 4:
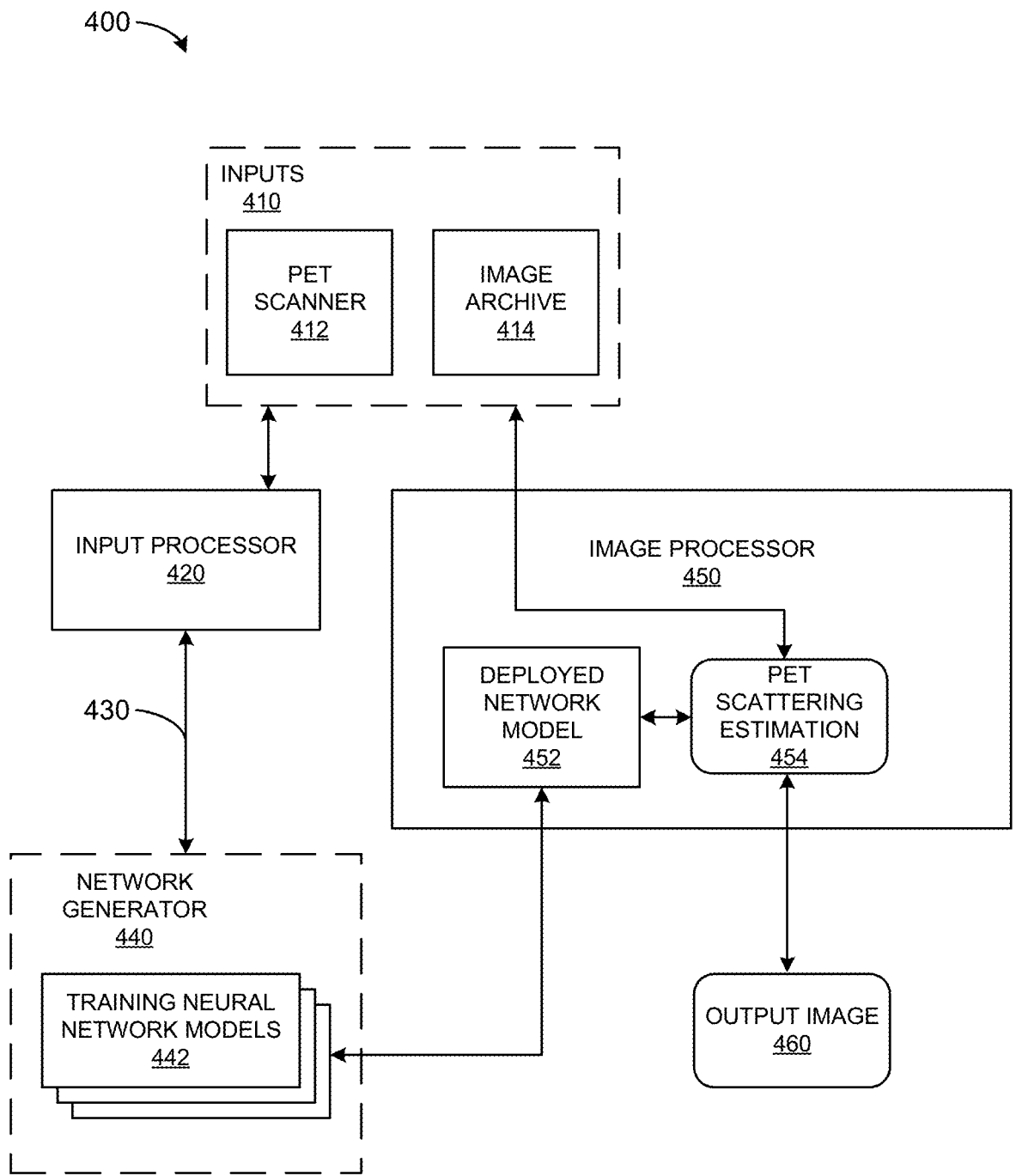
FIG. 4 is a block diagram of an example processor system that may be used to implement systems and methods described herein.

FIG. 4 is block diagram of an example processing system 400 used to estimate PET photon scattering. The processing system 400 includes image inputs 410. Images 410 can be introduced to an input processor 420 from either a PET scanner 412 (and/or other imaging device) or an image archive 414. The input processor 420 uses the image inputs 410 to send training data 430 to the network generator 440. Using the training data 430 the network generator 440 develops training neural network models 442. Once a neural network model 442 has been verified for accuracy and thoroughly tested it can be deployed as a neural network model 452 (such as the inception neural network model 100, etc.) ready for application. An image processor 450 communicates with imaging inputs 410. Because the image processor 450 utilizes a deployed network model 452, the image inputs 410 can include patient image data that is ready to be read to determine a diagnosis. Using the deployed network model 452 and an image input 410, the image processor 450 can estimate PET photon scattering 454. The estimated PET scattering 454 can then be subtracted from the initial image input 410 to generate an output image 460 that is clean (e.g., quantitative) and ready to be read to diagnose a patient.

Figure 5:
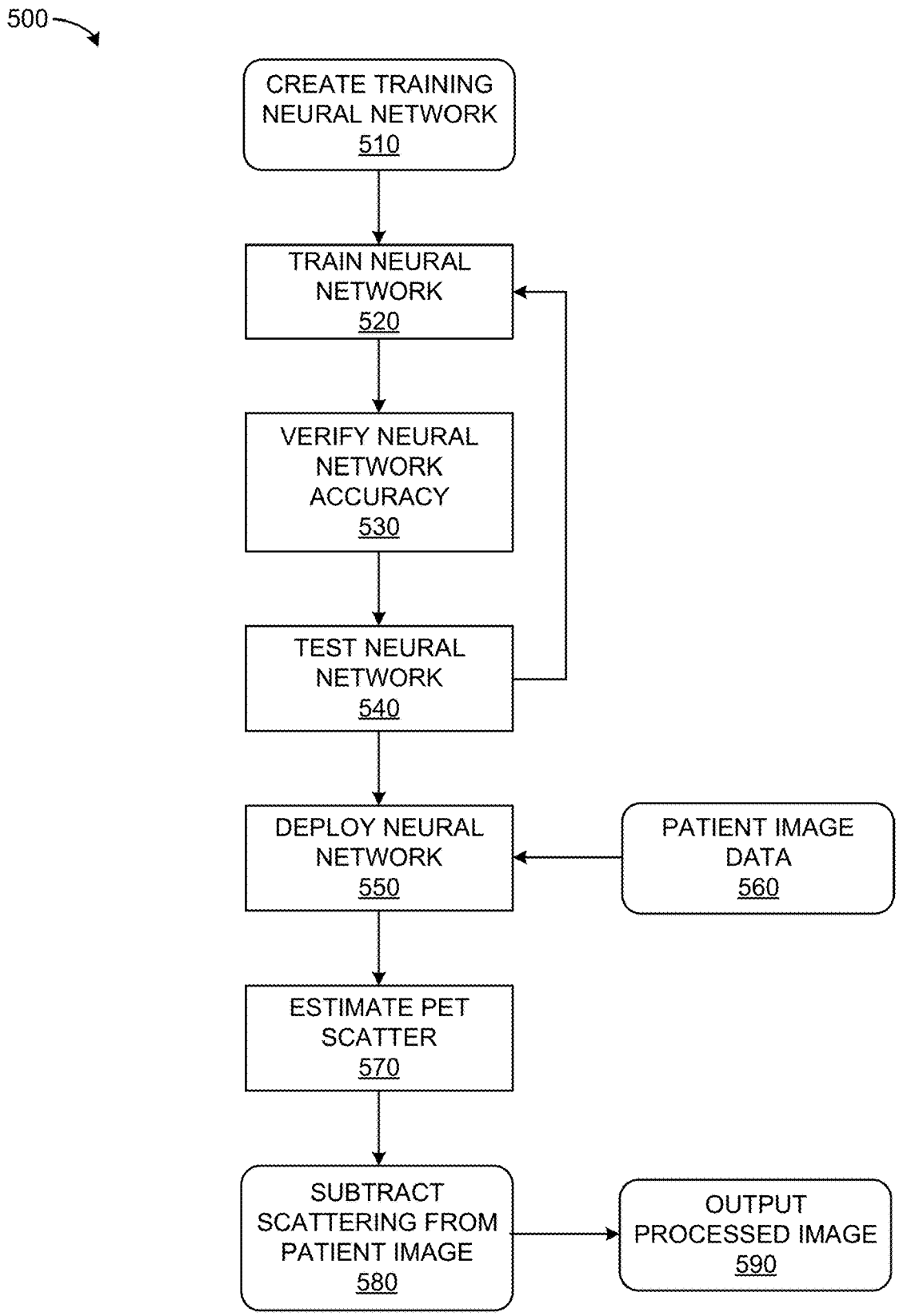
FIG. 5 illustrates an example flowchart of the processes used to estimate PET scatter.

FIG. 5 illustrates an example flowchart 500 of the processes used to estimate PET photon scattering and generate a PET scan that is ready to be read to diagnose a patient. Using the inception neural network model, a training neural network 510 is created. The network 510 includes an input layer and several blocks of layers of filters that are concatenated together to best estimate scattering in a PET image. The neural network 510 also includes a fully connected layer, an activation layer, and an output layer. After the training neural network 510 has been constructed the network 510 can be trained 520. To train 520 the neural network 510 two inputs (e.g., such as inputs 102, 104 formed from a same test or reference image (e.g., an image of a known phantom, etc.), etc.) can be compared after going through the neural network 520. One input, such as a raw PET sinogram, can be compared to a second input, a such as a simulated phantom sinogram or other attenuation-corrected sinogram, an attenuation correction factor sinogram forms from a ratio of the raw and attenuation-corrected sinogram, etc. In certain examples, both inputs are formed from the same source image. The second input has a known output that can be used to compare and verify 530 the accuracy of training neural network 510.

After a training cycle 520 the neural network 510 can be tested 540 using a second simulated phantom sinogram. If the accuracy of the second simulated sinogram exceeds an accuracy threshold, then the training neural network 510 is ready to be deployed for application. For example, the accuracy threshold can be based on a degree of convergence or similarity between a first output of the training neural network 510 from the first input and a second output of the training neural network 510 from the second input. The outputs converge when the training neural network 510 is determining the same (or similar within a specified margin of error) estimate of scatter. If testing fails to produce accurate, converging output, then additional training occurs.

Once satisfactorily tested, the deployed neural network 550 can then take inputs of real patient image data 560 to estimate PET photon scattering 570. The estimated photon scattering 570 can be subtracted 580 from the initial patient image 560 to produce a final "clean" or quantitative image that can be used to diagnose a patient. This processed image is output 590 for display, storage, processing by a computer-aided detection (CAD) algorithm, formatted for radiology reading, provided to another clinical system for further image processing, etc.

Certain examples provide a modified inception neural network model for imaging that estimates photon scattering found in PET scan images. After the photon scattering has been estimated it can be subtracted from the entire PET scan image to clean up any noise found in the image. The modified inception model is able to incorporate filters of various sizes to capture the entire FOV and the local details of the PET image. Compared to previously used methods of estimating PET scatter, such as CNN models, the inception neural network can be modified as described herein to reduce the computational cost of training and using the neural network by decreasing the amount of parameters in the network. The decrease in parameters also improves the robustness of the neural network by reducing the probability of overfitting. The modified inception model also increases the accuracy and efficiency when estimating photon scattering for both single and multiple scattering events.

A flowchart or flow diagram representative of example machine readable instructions for implementing and/or executing in conjunction with the example systems/apparatus of FIGS. 1-4 is shown above in FIG. 5. In these examples, the machine readable instructions comprise a program for execution by a processor such as the processor 612 shown in the example processor platform 600 discussed below in connection with FIG. 6. The program can be embodied in software stored on a tangible computer readable storage medium such as a CD-ROM, a floppy disk, a hard drive, a digital versatile disk (DVD), a BLU-RAY™ disk, or a memory associated with the processor 612, but the entire program and/or parts thereof could alternatively be executed by a device other than the processor 612 and/or embodied in firmware or dedicated hardware. Further, although the example program is described with reference to the flowchart and/or process(es) illustrated in FIG. 5, many other methods of implementing the examples disclosed and described here can alternatively be used. For example, the order of execution of the blocks can be changed, and/or some of the blocks described can be changed, eliminated, or combined.

As mentioned above, the example process(es) of FIG. 5 can be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) of FIG. 5 can be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The subject matter of this description may be implemented as stand-alone system or for execution as an application capable of execution by one or more computing devices. The application (e.g., webpage, downloadable applet or other mobile executable) can generate the various displays or graphic/visual representations described herein as graphic user interfaces (GUIs) or other visual illustrations, which may be generated as webpages or the like, in a manner to facilitate interfacing (receiving input/instructions, generating graphic illustrations) with users via the computing device(s).

Memory and processor as referred to herein can be stand-alone or integrally constructed as part of various programmable devices, including for example a desktop computer or laptop computer hard-drive, field-programmable gate arrays (FPGAs), application-specific integrated circuits (ASICs), application-specific standard products (ASSPs), system-on-a-chip systems (SOCs), programmable logic devices (PLDs), etc. or the like or as part of a Computing Device, and any combination thereof operable to execute the instructions associated with implementing the method of the subject matter described herein.

Computing device as referenced herein can include: a mobile telephone; a computer such as a desktop or laptop type; a Personal Digital Assistant (PDA) or mobile phone; a notebook, tablet or other mobile computing device; or the like and any combination thereof.

Computer readable storage medium or computer program product as referenced herein is tangible (and alternatively as non-transitory, defined above) and can include volatile and non-volatile, removable and non-removable media for storage of electronic-formatted information such as computer readable program instructions or modules of instructions, data, etc. that may be stand-alone or as part of a computing device. Examples of computer readable storage medium or computer program products can include, but are not limited to, RAM, ROM, EEPROM, Flash memory, CD-ROM, DVD-ROM or other optical storage, magnetic cassettes, magnetic tape, magnetic disk storage or other magnetic storage devices, or any other medium which can be used to store the desired electronic format of information and which can be accessed by the processor or at least a portion of the computing device.

The terms module and component as referenced herein generally represent program code or instructions that causes specified tasks when executed on a processor. The program code can be stored in one or more computer readable mediums.

Network as referenced herein can include, but is not limited to, a wide area network (WAN); a local area network (LAN); the Internet; wired or wireless (e.g., optical, Bluetooth, radio frequency (RF)) network; a cloud-based computing infrastructure of computers, routers, servers, gateways, etc.; or any combination thereof associated therewith that allows the system or portion thereof to communicate with one or more computing devices.

The term user and/or the plural form of this term is used to generally refer to those persons capable of accessing, using, or benefiting from the present disclosure.

Figure 6:
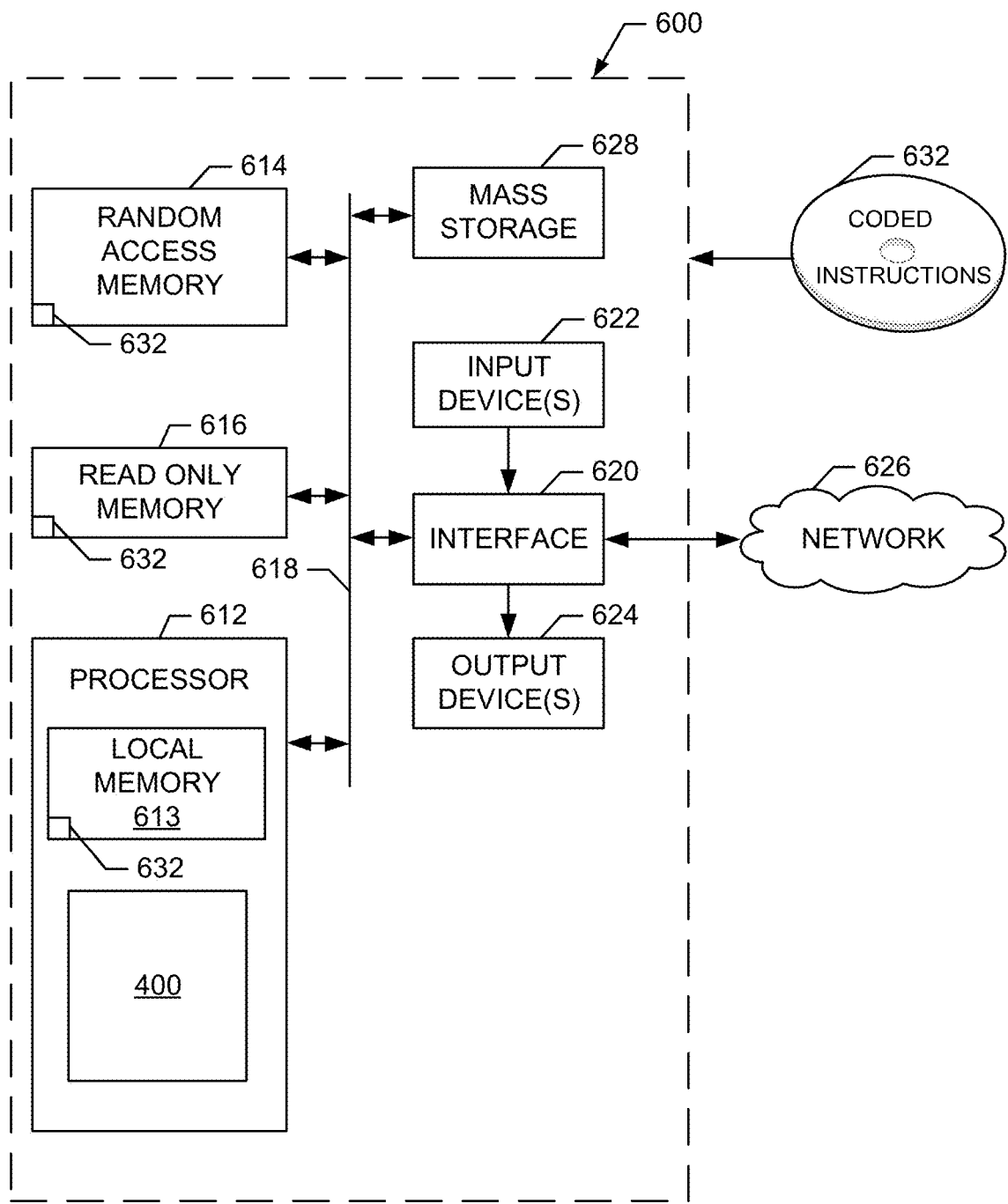
FIG. 6 is a block diagram of an example processor platform capable of executing instructions to implement the example systems and methods disclosed and described herein.

FIG. 6 is a block diagram of an example processor platform 600 capable of executing instructions to implement the example systems and methods disclosed and described herein. The processor platform 600 can be, for example, a server, a personal computer, a mobile device (e.g., a cell phone, a smart phone, a tablet such as an IPAD™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 can be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 can be implemented by flash memory and/or any other desired type of memory device. Access to the main memory 614, 616 is controlled by a memory controller.

The processor platform 600 of the illustrated example also includes an interface circuit 620. The interface circuit 620 can be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 can be stored in the mass storage device 628, in the volatile memory 614, in the non-volatile memory 616, and/or on a removable tangible computer readable storage medium such as a CD or DVD. The instructions 632 can be executed by the processor 612 to implement the example network model 110, system 400, etc., as disclosed and described above.

From the foregoing, it will be appreciated that the above disclosed methods, apparatus, and articles of manufacture have been disclosed to improve operation of imaging and/or other healthcare systems using deep learning and/or other machine learning techniques. The disclosed methods, apparatus and articles of manufacture improve the operation of a computing device by expanding it with a capability to identify and model scatter in a PET image and/or other medical diagnostic image and improve quality of that image by removing the identified scatter from the image data through incorporation of a trained and deployed deep neural network model. Speed, accuracy, and flexibility of training, testing, and deployed image processing are improved through the multi-scale, multi-size layers of the inception neural network. The configuration and deployment of the inception neural network model with respect to an imaging device and an image processor alters and improves the operation and configuration of at least the computer including the image processor as well as other systems receiving and further processing the processed image. The disclosed methods, apparatus and articles of manufacture are accordingly directed to one or more improvement(s) in the functioning of a computer. The disclosed methods, apparatus and articles of manufacture further enable a new and different interaction between the imaging device and a resulting healthcare system via the image processor and network generator, etc. The disclosed examples do not direct or organize human activity and cannot be done mentally in the human mind. Rather, they modify computing technology to instantiate an improved network model and technologically improve image processing.

Compared to previously used methods of estimating scatter, such as other CNN models, the inception neural network can be modified as described herein to reduce the computational cost of training and using the neural network by decreasing the number of parameters in the network. The decrease in parameters also improves the robustness of the neural network by reducing the probability of overfitting. The modified, multi-scale inception model also increases the accuracy and efficiency when estimating photon scattering for both single and multiple scattering events.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The invention claimed is:

1. An apparatus comprising:
 a network generator to generate and train an inception neural network using a first input and a second input to deploy an inception neural network model to process image data when a first output of the inception neural network from the first input converges with a second output of the inception neural network from the second input, the first input based on a raw sinogram of a first image and the second input based on an attenuation-corrected sinogram of the first image, the inception neural network including a first filter of a first size and a second filter of a second size in a concatenation layer to process at least one of the first input or the second input to generate an estimate of scatter in the first image; and an image processor to apply the estimate of scatter to a second image to generate a processed image and to output the processed image for at least one of storage or display.

2. The apparatus of claim 1, wherein the first image is a positron emission tomography (PET) image.

3. The apparatus of claim 1, wherein the network generator is to determine an attenuation correction factor using a ratio between the first input and the second input.

4. The apparatus of claim 3, wherein the second input includes the attenuation correction factor.

5. The apparatus of claim 1, wherein the first filter includes a 1×n filter and the second filter includes a n×1 filter, the first filter and the second filter combined to implement a n×n convolution filter.

6. The apparatus of claim 1, wherein the first input includes a simulated scatter sinogram.

7. The apparatus of claim 1, where the scatter includes at least one of single scatter, multiple scatter, or out of axial field of view scatter.

8. The apparatus of claim 1, wherein the inception neural network is a multi-scale network including a plurality of blocks of layers of filters, wherein each block of filters is concatenated and a final filter concatenation layer is an input into a fully connected layer that is an input into an activation layer that is an input into an output layer to generate the estimate of scatter.

9. At least one non-transitory computer-readable storage medium comprising instructions that, when executed, cause at least one processor to:

train an inception neural network using a first input and a second input formed from a first image, the first input based on a raw sinogram of the first image and the second input based on an attenuation-corrected sinogram of the first image, the inception neural network including a first filter of a first size and a second filter of a second size in a concatenation layer to process at least one of the first input or the second input to generate an estimate of scatter in the first image;

test the inception neural network to determine convergence between a first output of the inception neural network from the first input and a second output of the inception neural network from the second input; and deploy a model of the inception neural network to process a second image to estimate image scattering in the second image for removal of the estimated image scattering from the second image to generate a processed image.

10. The at least one non-transitory computer-readable storage medium of claim 9, wherein the first image is a positron emission tomography (PET) image.

11. The at least one non-transitory computer-readable storage medium of claim 9, wherein the instructions, when executed, cause the at least one processor to determine an attenuation correction factor using a ratio between the first input and the second input.

12. The at least one non-transitory computer-readable storage medium of claim 11, wherein the second input includes the attenuation correction factor.

13. The at least one non-transitory computer-readable storage medium of claim 9, wherein the first filter includes a 1×n filter and the second filter includes a n×1 filter, the first filter and the second filter combined to implement a n×n convolution filter.

14. The at least one non-transitory computer-readable storage medium of claim 9, where the scatter includes at least one of single scatter, multiple scatter, or out of axial field of view scatter.

15. The at least one non-transitory computer-readable storage medium of claim 9, wherein the inception neural network is a multi-scale network including a plurality of blocks of layers of filters, wherein each block of filters is concatenated and a final filter concatenation layer is an input into a fully connected layer that is an input into an activation layer that is an input into an output layer to generate the estimate of scatter.

16. A method of processing an image to estimate and remove image scatter, the method comprising:

training an inception neural network using a first input and a second input formed from a first image, the first input based on a raw sinogram of the first image and the second input based on an attenuation-corrected sinogram of the first image, the inception neural network including a first filter of a first size and a second filter of a second size in a concatenation layer to process at least one of the first input or the second input to generate an estimate of scatter in the first image;

testing the inception neural network to determine convergence between a first output of the inception neural network from the first input and a second output of the inception neural network from the second input; and deploying a model of the inception neural network to process a second image to estimate image scattering in the second image for removal of the estimated image scattering from the second image to generate a processed image.

17. The method of claim 16, wherein the first image is a positron emission tomography (PET) image.

18. The method of claim 16, further including determining an attenuation correction factor using a ratio between the first input and the second input and incorporating the attenuation correction factor into the second input.

19. The method of claim 16, wherein the first filter includes a 1×n filter and the second filter includes a n×1 filter, the first filter and the second filter combined to implement a n×n convolution filter.

20. The method of claim 16, wherein the inception neural network is a multi-scale network including a plurality of blocks of layers of filters, wherein each block of filters is concatenated and a final filter concatenation layer is an input into a fully connected layer that is an input into an activation layer that is an input into an output layer to generate the estimate of scatter.

* * * * *